(12) United States Patent
Yacoub (10) Patent No.: US 8,683,781 B2
(45) Date of Patent: Apr. 1, 2014

(54) METHOD FOR CONTROLLING AN EXHAUST-GAS AFTERTREATMENT DEVICE OF A HYBRID DRIVE, AND HYBRID DRIVE

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 13/247,849

(22) Filed: Sep. 28, 2011

(65) Prior Publication Data

US 2012/0079822 A1 Apr. 5, 2012

(30) Foreign Application Priority Data

Oct. 1, 2010 (DE) .......................... 10 2010 037 924

(51) Int. Cl.
*F01N 3/00* (2006.01)

(52) U.S. Cl.
USPC ................... 60/285; 60/274; 60/284; 60/286; 60/277

(58) Field of Classification Search
USPC .................................................. 60/274–324
See application file for complete search history.

(56) References Cited

U.S. PATENT DOCUMENTS

| 6,901,751 | B2 * | 6/2005 | Bunting et al. | 60/297 |
| 6,910,329 | B2 * | 6/2005 | Bunting et al. | 60/297 |
| 7,059,116 | B2 * | 6/2006 | Kusada et al. | 60/285 |
| 2005/0262827 | A1 * | 12/2005 | Ichimoto et al. | 60/277 |
| 2008/0078166 | A1 * | 4/2008 | Rose et al. | 60/284 |
| 2009/0301437 | A1 * | 12/2009 | Mizoguchi et al. | 123/443 |

FOREIGN PATENT DOCUMENTS

| DE | 101 61 850 A1 | 7/2003 |
| DE | 103 33 210 A1 | 1/2005 |
| DE | 103 06 954 B4 | 1/2007 |
| DE | 10 2009 038 110 A1 | 4/2010 |
| EP | 0 989 299 B1 | 4/2003 |

* cited by examiner

*Primary Examiner* — Jesse Bogue
(74) *Attorney, Agent, or Firm* — Julia Voutyras; Alleman Hall McCoy Russell & Tuttle LLP (57) ABSTRACT

A method for controlling an exhaust gas aftertreatment device of a vehicle hybrid drive is provided. The method comprises operating the hybrid drive only by a combustion engine, only by a non-combustion motor, or by both, as a function of a temperature of the exhaust aftertreatment device, and conducting exhaust gas of the hybrid drive at least partially through the exhaust aftertreatment device, the engine and motor each providing output to power the vehicle. In this way, the aftertreatment device may be operated at an optimal temperature for conversion performance.

9 Claims, 5 Drawing Sheets

METHOD FOR CONTROLLING AN EXHAUST-GAS AFTERTREATMENT DEVICE OF A HYBRID DRIVE, AND HYBRID DRIVE

RELATED APPLICATIONS

This application claims priority to German Patent Application No. 102010037924.7, filed Oct. 1, 2010, the entire contents of which are herein incorporated by reference for all purposes.

FIELD

The present disclosure relates to a method for controlling an exhaust-gas aftertreatment device of a hybrid drive.

BACKGROUND AND SUMMARY

It is generally known, in order to reduce the pollutant emissions, to treat the exhaust gases of a combustion engine, for example of an Otto or diesel engine, by an exhaust-gas treatment device arranged in the exhaust tract. Here, the efficiency of the exhaust-gas aftertreatment device is influenced very decisively by the temperature prevailing in the exhaust-gas aftertreatment device and by the fuel/air ratio used during the combustion in the combustion engine. In order, for example, to realize adequate conversion performance of the exhaust-gas aftertreatment device, a certain operating temperature, the so-called light-off temperature, may be attained, which may be 120° C. to 250° C.

In motor vehicles driven by Otto or diesel engines, it is, for example, conventional to control the temperature of the exhaust-gas aftertreatment device so as to ensure a fast light-off of the catalytic converter, for example in the case of an Otto engine, by temporarily setting a late ignition angle, as a result of which the combustion is shifted partially into the outlet tract and the exhaust-gas temperature during the warm-up phase is increased. In the case of diesel engines, it is inter alia conventional, for example in order to assist the regeneration of soot filters, to increase the exhaust-gas temperature from time to time by intake air throttling and/or intake air pre-heating and/or by a late start of injection and/or post injection.

Likewise, in the case of motor vehicles with a so-called automatic start-stop facility, a control regime is known which helps to prevent the temperature of the exhaust-gas aftertreatment device from falling below a certain limit value, for example the light-off temperature, during a temporary stop phase. For example, EP 0 989 299 B1 discloses a control device for a motor vehicle engine, which control device is configured so as to change the state of the motor vehicle engine automatically between a stopped state and an operating state on the basis of a predetermined condition. In particular, the described control device is capable of preventing an engagement shock of a frictional engagement or clutch device by engine torque control at the time of start-up of the vehicle, even if the engine torque control is not possible. To determine whether or not engine torque control can be carried out, it is proposed inter alia that the temperature of a catalytic converter be determined, and that a torque reduction not be carried out if said temperature is lower than a certain value.

In particular during operation of a combustion engine in the low-load range, for example at an engine output power of less than approximately 20 Nm or when the engine is being used as an engine brake, the stability of the combustion is a problem which cannot be disregarded with regard to a post-injection calibration. Furthermore, at a relatively low combustion pressure within the respective engine cylinder, there is an increased tendency for the fuel injected into the cylinder to precipitate on the cylinder interior walls. This leads to excessive contamination of the engine oil. Furthermore, the attainment of high exhaust-gas temperatures, for example for the regeneration of soot filters, is particularly difficult in the low-load range in particular in the case of diesel engines on account of the combustion thereof, which is already lean out of principle.

The inventors have recognized the above issues and provide a solution herein to at least partly address them. A method for controlling an exhaust-gas aftertreatment device of a vehicle hybrid drive is provided. The method comprises operating the hybrid drive only by a combustion engine, only by a non-combustion motor, or by both, as a function of a temperature of the exhaust aftertreatment device, and conducting exhaust gas of the hybrid drive at least partially through the exhaust aftertreatment device, the engine and motor each providing output to power the vehicle.

In this way, the temperature of the aftertreatment device may be controlled by controlling the extent to which the exhaust gases produced by the engine are conducted through the device. For example, if the exhaust temperature is greater than the temperature of the device and the device is currently operating at a temperature lower than desired, the hybrid drive may be operated by only the engine in order to quickly heat up the device. Thus, this permits optimum operation of the exhaust-gas aftertreatment device in particular with regard to exhaust-gas purification or conversion performance.

It is pointed out that the features specified individually in the patent claims may be combined with one another in any desired technologically meaningful way and discloses further embodiments of the present disclosure. The description, in particular in conjunction with the figures, characterizes and specifies the disclosure further.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
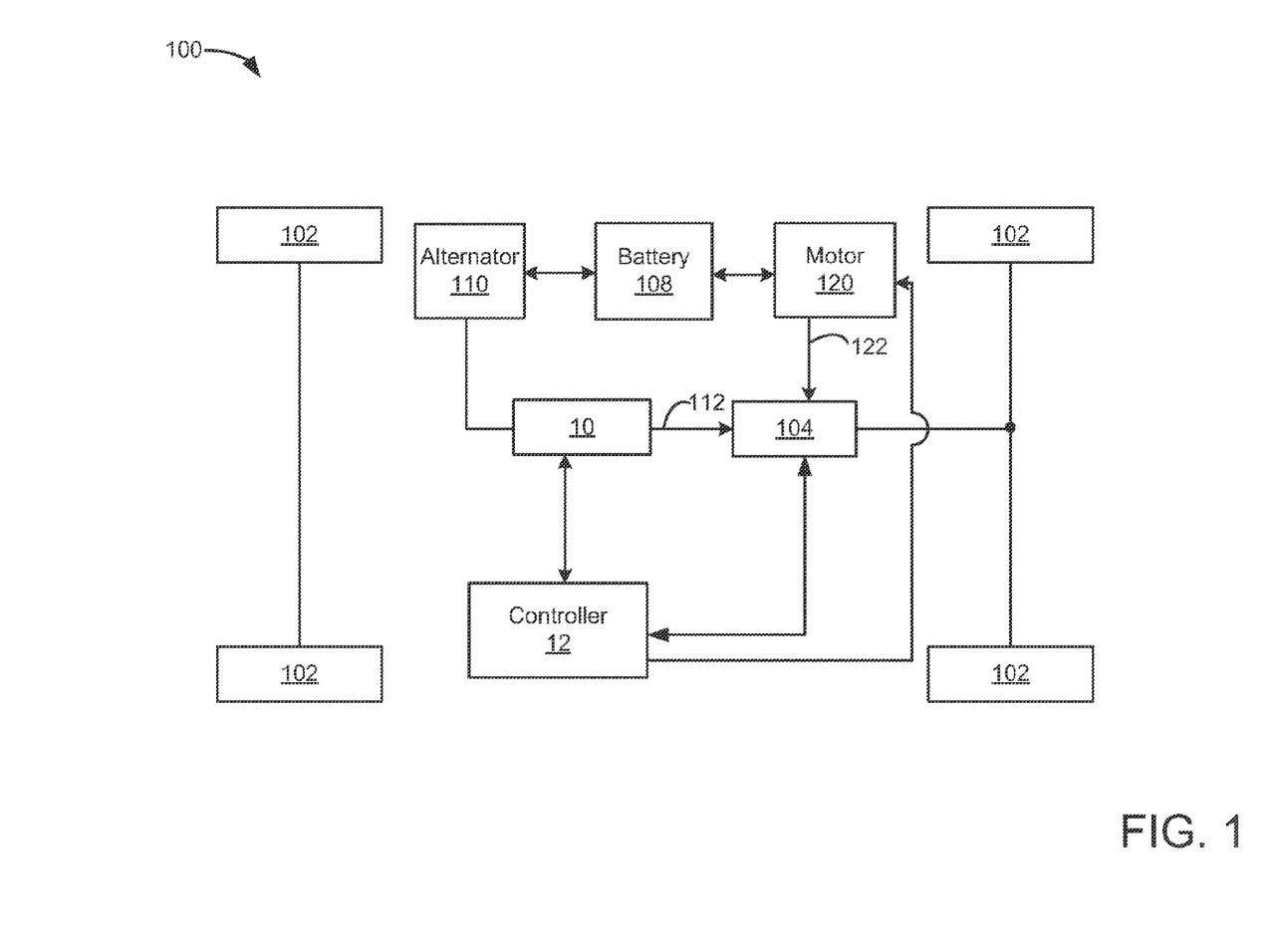
FIG. 1 shows a schematic depiction of a vehicle system according to an embodiment of the disclosure.
Figure 2:
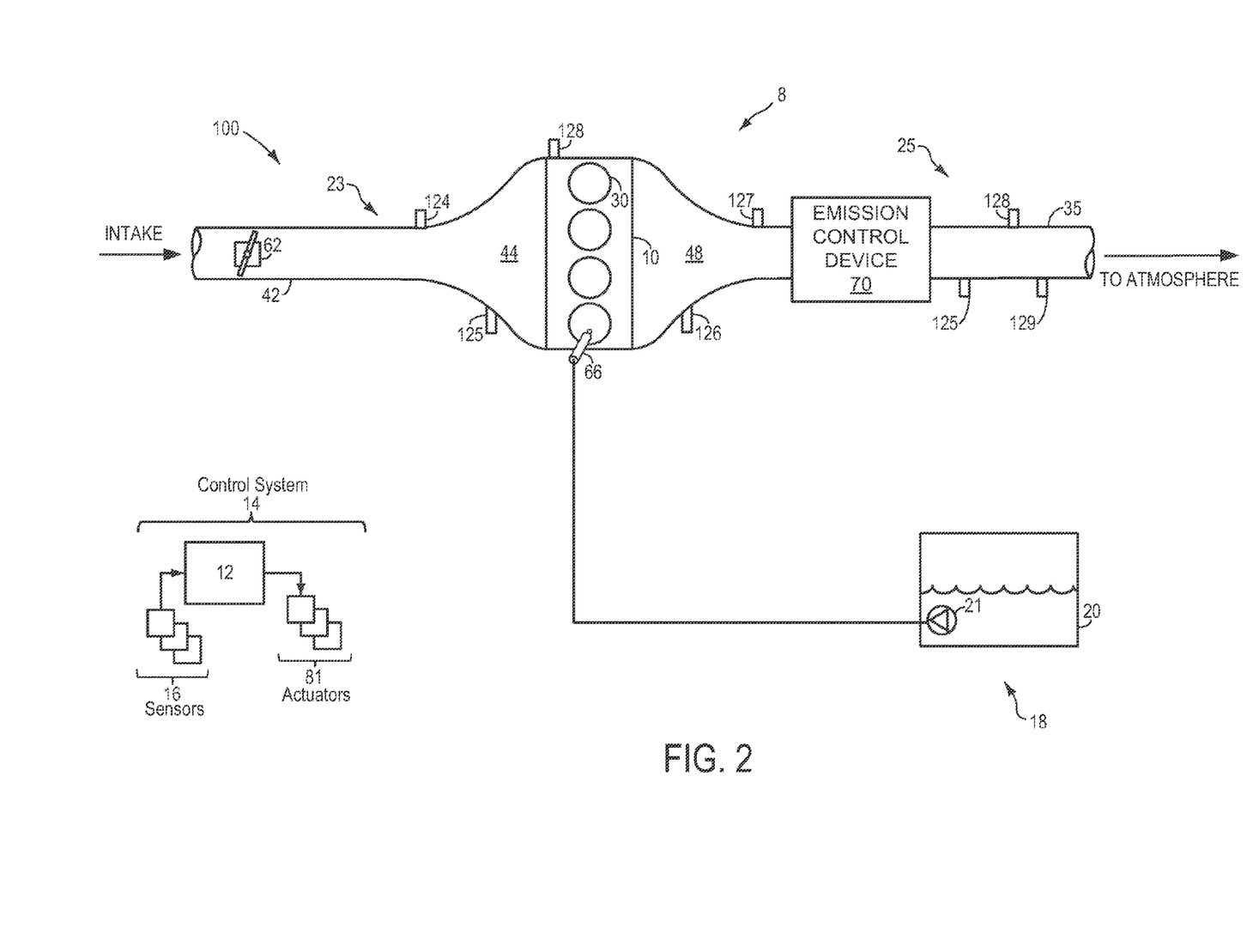
FIG. 2 shows a schematic depiction of an engine system according to an embodiment of the disclosure.
Figure 3:
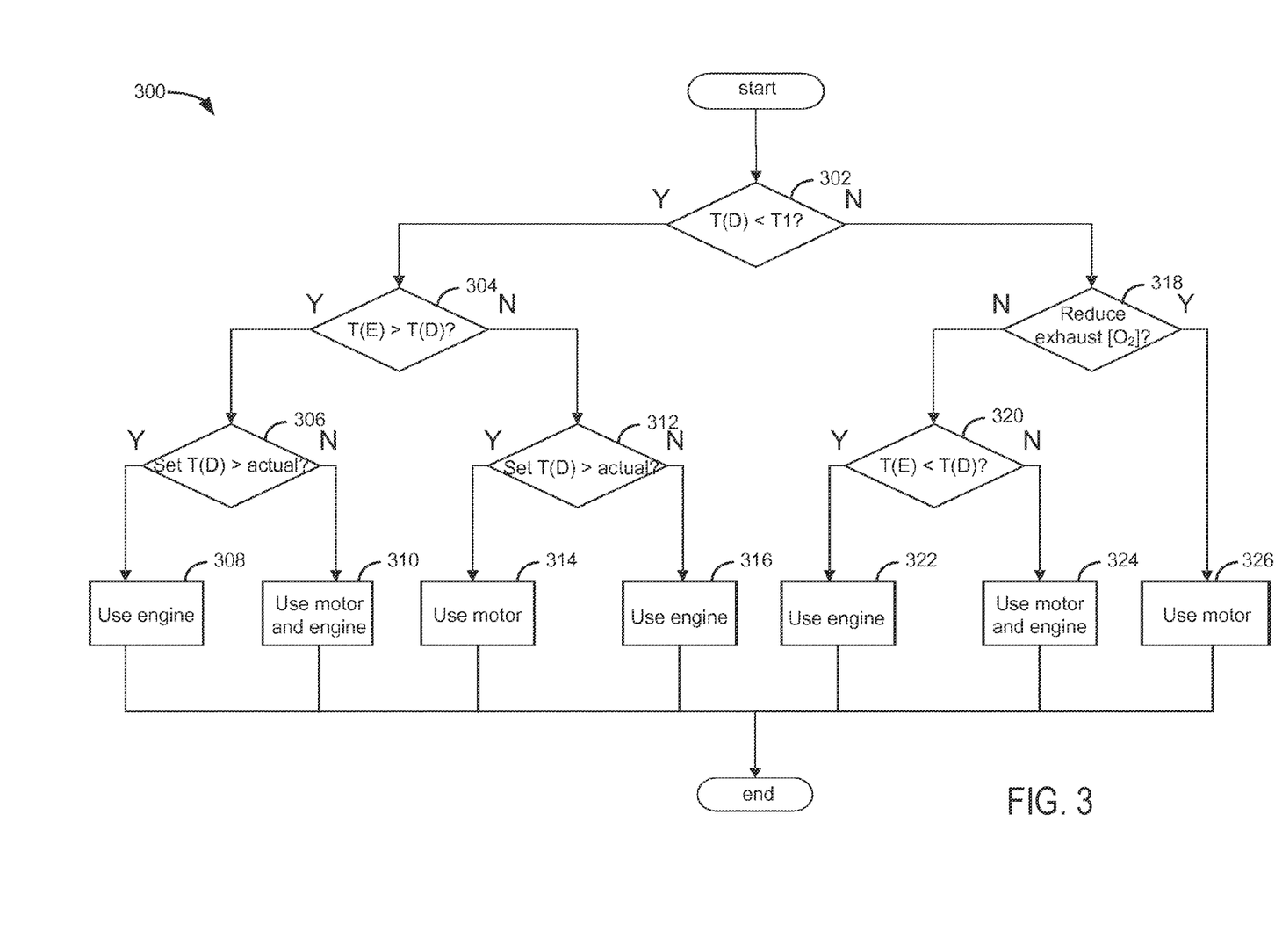
FIG. 3 shows a flow diagram depicting an exemplary embodiment of a method according to the disclosure.
Figure 4:
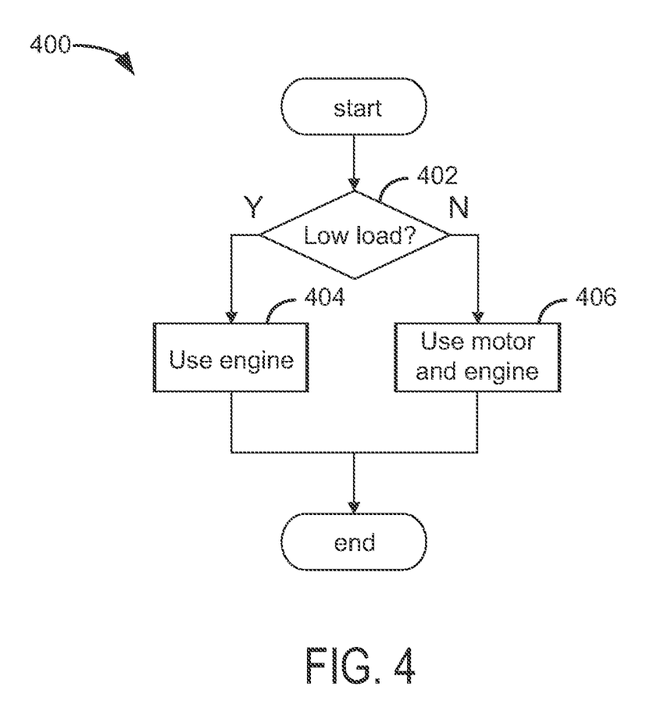
FIG. 4 shows a flow diagram depicting an exemplary embodiment of a further method according to the disclosure.
Figure 5:
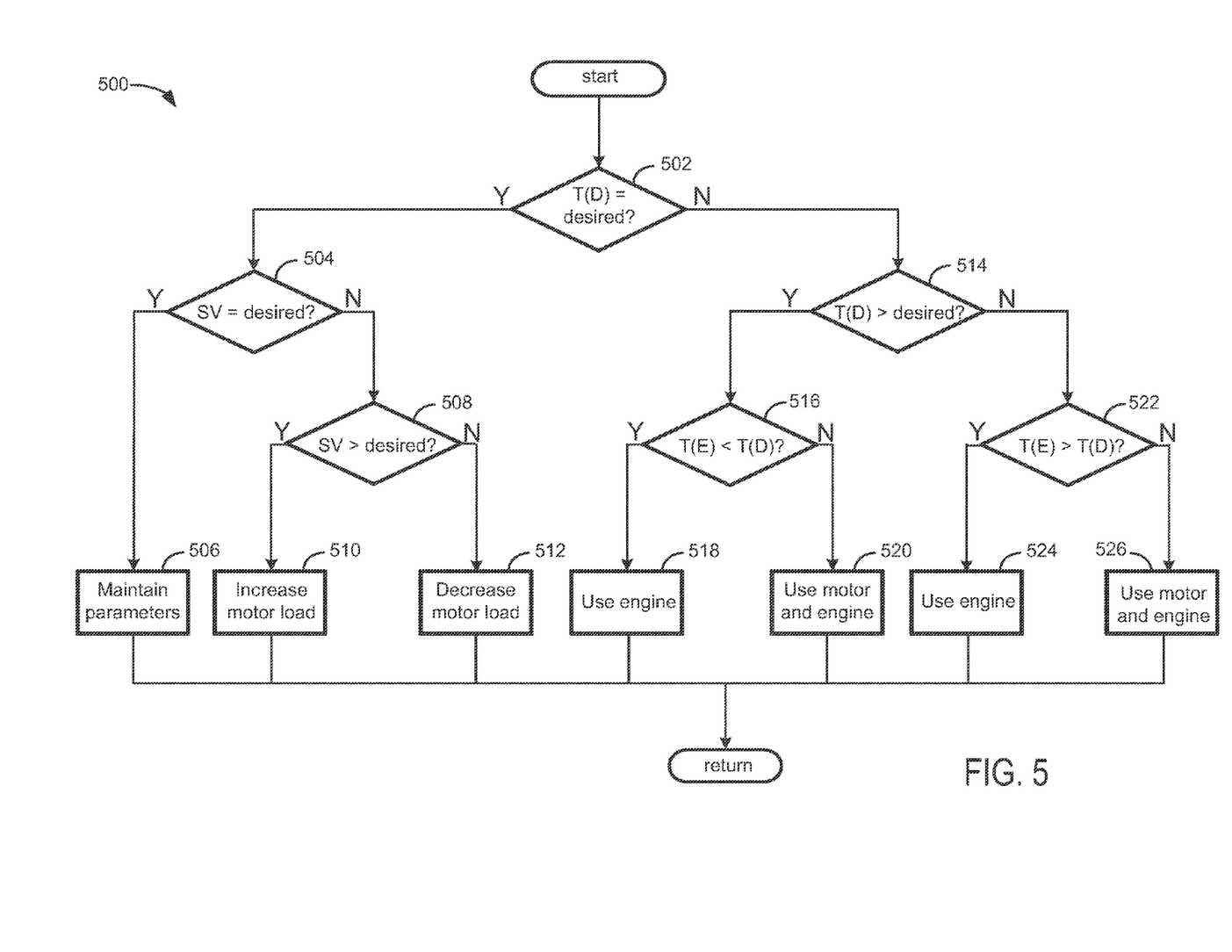
FIG. 5 shows a flow diagram depicting an exemplary embodiment of another method according to the disclosure.

Hybrid drive systems for motor vehicles rely on both an engine and a motor to provide torque to propel the vehicle. Under some conditions, it may be advantageous to operate both the engine and the motor simultaneously, while under other conditions, it may advantageous to operate only the motor or only the engine. In embodiments described herein, the operation of the hybrid drive may be adjusted based on an exhaust aftertreatment device coupled to the engine. An example vehicle system including a hybrid drive is depicted in FIGS. 1 and 2. Example methods for adjusting the hybrid drive based on an exhaust aftertreatment device are depicted in FIGS. 3-5.

FIG. 1 illustrates an example vehicle propulsion system 100. Vehicle propulsion system 100 includes a fuel burning engine 10 and a motor 120. As a non-limiting example, engine 10 comprises an internal combustion engine and motor 120 comprises an electric motor. Motor 120 may be configured to utilize or consume a different energy source than engine 10. For example, engine 10 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 includes wheels 102. Torque is supplied to wheels 102 via engine 10 and transmission 104. In some embodiments, motor 120 may also provide torque to wheels 102.

Vehicle propulsion system 100 may utilize a variety of different operational modes depending on operating conditions encountered by the vehicle propulsion system. Some of these modes may enable engine 10 to be maintained in an off state where combustion of fuel at the engine is discontinued. For example, under select operating conditions, motor 120 may propel the vehicle via transmission 104 as indicated by arrow 122 while engine 10 is deactivated.

During other operating conditions, motor 120 may be operated to charge an energy storage device such as battery 108. For example, motor 120 may receive wheel torque from transmission 104 as indicated by arrow 122 where the motor may convert the kinetic energy of the vehicle to electrical energy for storage at battery 108. Thus, motor 120 can provide a generator function in some embodiments. However, in other embodiments, alternator 110 may instead receive wheel torque from transmission 104, or energy from engine 10, where the alternator 110 may convert the kinetic energy of the vehicle to electrical energy for storage at battery 108.

During still other operating conditions, engine 10 may be operated by combusting fuel received from a fuel system (not shown in FIG. 1). For example, engine 10 may be operated to propel the vehicle via transmission 104 as indicated by arrow 112 while motor 120 is deactivated. During other operating conditions, both engine 10 and motor 120 may each be operated to propel the vehicle via transmission 104 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first drive system and engine 10 may propel the vehicle via a second drive system.

Operation in the various modes described above may be controlled by a controller 12. Controller 12 will be described below in more detail with respect to FIG. 2.

FIG. 2 shows a schematic depiction of additional components of vehicle propulsion system 100. The vehicle system 100 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, selective catalytic reduction (SCR) system, lean NOx trap, diesel particulate filter, oxidation catalyst, etc. Emission control device 70 may utilize reducants in the exhaust stream, such as urea or unburnt fuel, to reduce substrates such as NOx and CO in the exhaust. As such, emission control device 70 may include a reductant injector. In other embodiments, reductants may be introduced via a fuel injection system in the engine. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It can be appreciated that fuel system 18 may be a return-less fuel system, a return fuel system, or various other types of fuel system.

The fuel tank 20 may hold a plurality of fuel blends, including fuel with a range of alcohol concentrations, such as various gasoline-ethanol blends, including E10, E85, gasoline, diesel, etc., and combinations thereof.

The vehicle system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 and temperature sensor 127 located upstream of the emission control device, and airflow sensor 125, exhaust gas sensor 128, and temperature sensor 129 located downstream of the emission control device. Other sensors such as pressure, temperature, air/fuel ratio, and composition sensors may be coupled to various locations in the vehicle system 100. As another example, the actuators may include fuel injector 66 and throttle 62.

The control system 14 may include a controller 12 comprising a computer readable storage medium comprising instructions that may be executed to carry out one more control routines. The controller may receive input data from the various sensors, process the input data, and trigger the actuators in response to the processed input data based on instruction or code programmed therein corresponding to one or more routines. Example control routines are described herein with regard to FIGS. 3-5.

The efficiency of an exhaust-gas aftertreatment device is very significantly dependent upon the operating temperature of the exhaust-gas aftertreatment device, and that during the operation of the exhaust-gas aftertreatment device, very different temperature windows for correct and optimum operation of the exhaust-gas aftertreatment device play a decisive role, as will be explained below.

Typically, in Otto engines, use is made for example of catalytic reactors which, through the use of catalytic materials which increase the rate of certain reactions, ensure an oxidation of HC and CO even at low temperatures. If nitrogen oxides ($NO_x$) are additionally to be reduced, this may be achieved through the use of a three-way catalytic converter, which however for this purpose which performs optimally at stoichiometric operation ($\lambda \approx 1$) of the Otto engine within narrow limits. Here, the nitrogen oxides $NO_x$ are reduced by means of the non-oxidized exhaust-gas components which are present, specifically the carbon monoxides and the unburned hydrocarbons, wherein said exhaust-gas components are oxidized at the same time.

In combustion engines which are operated with an excess of air, that is to say for example Otto engines which operate in the lean-burn mode, but in particular direct-injection diesel engines or also direct-injection Otto engines, the nitrogen oxides contained in the exhaust gas cannot be reduced out of principle, that is to say on account of the lack of reducing agent.

For the oxidation of the unburned hydrocarbons and of carbon monoxide, provision is made in particular of an oxidation catalytic converter in the exhaust-gas flow. To realize an adequate conversion, a certain operating temperature is demanded. The so-called light-off temperature may be 120° C. to 250° C.

To reduce the nitrogen oxides, use is also made of selective catalytic converters, so-called SCR catalytic converters, in which reducing agent is purposely introduced into the exhaust gas in order to selectively reduce the nitrogen oxides. As reducing agent, in addition to ammonia and urea, use may also be made of unburned hydrocarbons. The latter is also referred to as HC enrichment, with the unburned hydrocarbons being introduced directly into the exhaust tract or else being supplied by means of engine-internal measures, specifically by means of a post-injection of additional fuel into the combustion chamber after the actual combustion.

It is basically also possible to reduce the nitrogen oxide emissions by means of so-called nitrogen oxide storage catalytic converters. Here, the nitrogen oxides are initially absorbed, that is to say collected and stored, in the catalytic converter during a lean-burn mode of the combustion engine before being reduced during a regeneration phase for example by means of substoichiometric operation (for example $\lambda<0.95$) of the combustion engine with a lack of oxygen.

Further possible engine-internal measures for realizing rich, that is to say substoichiometric operation of the combustion engine are exhaust-gas recirculation and, in the case of diesel engines, throttling in the intake tract. It is possible to dispense with engine-internal measures if the reducing agent is introduced directly into the exhaust tract, for example by means of an injection of additional fuel. During the regeneration phase, the nitrogen oxides are released and converted substantially into nitrogen dioxide ($N_2$), carbon dioxide ($CO_2$) and water ($H_2O$). The frequency of the regeneration phases is determined by the overall emissions of nitrogen oxides and the storage capacity of the nitrogen oxide storage catalytic converter.

The temperature of the storage catalytic converter should preferably lie in a temperature window between 200° C. and 450° C., such that firstly a fast reduction of the nitrogen oxides is ensured and secondly no desorption without conversion of the re-released nitrogen oxides takes place, such as may be triggered by excessively high temperatures.

One difficulty in the use of the storage catalytic converter in the exhaust track arises from the sulfur contained in the exhaust gas, which sulfur is likewise absorbed in the storage catalytic converter and may be regularly removed by means of a desulfurization. For this purpose, the storage catalytic converter may be heated to high temperatures, usually of between 600° C. and 700° C., and supplied with a reducing agent, which in turn can be attained by means of a transition to rich operation of the combustion engine. The higher the temperature of the storage catalytic converter is, the more effective the desulfurization is, wherein an admissible maximum temperature may not be exceeded, because then the desulfurization of the storage catalytic converter contributes significantly to the thermal aging of the storage catalytic converter as a result of excessively high temperatures. This adversely affects the desired conversion of the nitrogen oxides toward the end of the service life of the catalytic converter, wherein in particular the thermal storage capacity decreases as a result of thermal aging.

To minimize the emissions of soot particles, use is made of so-called regenerative particle filters which filter the soot particles out of the exhaust gas and store them, with said soot particles being burned off intermittently during the course of the regeneration of the filter, usually at high temperatures of around 550° C. Here, the regeneration intervals are determined inter alia by the exhaust-gas back pressure, which is generated as a result of the increasing flow resistance of the filter on account of the increasing particle mass in the filter.

Since both the exhaust gases of Otto engines and also the exhaust gases of diesel engines contain unburned hydrocarbons (HC), carbon monoxide (CO), nitrogen oxides ($NO_x$) and also soot particles—albeit in different quantities and qualities—use is generally made of combined exhaust-gas aftertreatment devices which comprise one or more of the above-described catalytic converters and/or filters.

The increasing use of hybrid drives, in which conventionally in each case a combustion engine and an electric motor provide an output power, for example for driving a motor vehicle, offers completely new possibilities for the control of exhaust-gas aftertreatment devices, in particular with regard to optimum exhaust-gas purification or conversion performance under different operating conditions.

For efficient control, it is advantageous for suitable measurement devices, for example temperature sensors and/or flow sensors and/or sensors for determining chemical substances or elements contained in the exhaust-gas flow, to be provided in or near the exhaust-gas treatment device, in particular upstream and/or downstream of the exhaust-gas aftertreatment device as viewed in the exhaust-gas flow direction. It is thereby possible to determine the temperature window suitable for the respective optimum operation of the exhaust-gas aftertreatment device, and if appropriate to adapt or change said temperature window to certain operating states of the exhaust-gas aftertreatment device, for example for the regeneration of a soot particle filter and/or of a nitrogen oxide storage catalytic converter.

FIG. 3 illustrates a flow diagram depicting an exemplary embodiment of a first method 300 according to the disclosure. In the exemplary embodiment described below, the method 300 according to the disclosure is used for controlling an exhaust-gas aftertreatment device of a hybrid drive. The hybrid drive comprises a combustion engine, in particular a diesel engine, and a non-combustion motor, in particular an electric motor. The output power provided by the combustion engine and non-combustion motor for the hybrid drive is used, in the present exemplary embodiment, for driving a motor vehicle. Here, the output power may be provided by only the combustion engine, by only the non-combustion motor, or in a mixed operating mode, in which the total output power of the hybrid drive is composed of both the output power of the combustion engine and also the output power of the non-combustion motor. Furthermore, in the described exemplary embodiment, the non-combustion motor, in particular the electric motor, can likewise be used as a generator for charging an electric storage medium, in particular a battery, when not being used as a motor. In the described exemplary embodiment, the exhaust gases of the hybrid drive, in particular the exhaust gases of the combustion engine, are conducted entirely through the exhaust-gas aftertreatment device by means of a corresponding exhaust tract.

Method 300 comprises, at 302, determining whether the temperature of the exhaust-gas after-treatment device, T(D), is lower than a threshold value, T1. The threshold value is for example a maximum temperature of the exhaust-gas aftertreatment device below which optimum pollutant removal from the exhaust gas, that is to say optimum conversion performance of the exhaust-gas aftertreatment device, is attained and above which the conversion performance of the exhaust-gas aftertreatment device decreases considerably or the exhaust-gas aftertreatment device or parts thereof may be (thermally) damaged.

Furthermore, in the exemplary embodiment described here, the threshold value is a predefinable threshold value which can in particular also be varied during operation, such that an adaptation of the desired temperature window for the operation of the exhaust-gas aftertreatment device is easily possible as a function of the respective operating conditions, and optimum conversion or exhaust-gas purification performance of the exhaust-gas after-treatment device is ensured.

If it is identified in at 302 that the temperature of the exhaust-gas aftertreatment device is lower than the threshold value ("Yes"), the method 300 continues to 304, in which it is determined whether the exhaust-gas temperature of the combustion engine, T(E), is higher than the temperature of the exhaust-gas aftertreatment device.

If it is determined in 304 that the exhaust-gas temperature of the internal combustion engine is higher than the temperature of the exhaust-gas aftertreatment device ("Yes"), the method continues to 306, in which it is determined whether a setpoint temperature of the exhaust-gas after-treatment device is higher than the temperature of the exhaust-gas aftertreatment device.

In the described embodiment, the setpoint temperature is generally the temperature at which the exhaust-gas aftertreatment device attains an optimum conversion efficiency, that is to say optimum exhaust-gas purification performance. Depending on the respective operating state of the exhaust-gas aftertreatment device, however, the setpoint temperature may likewise be a temperature at which for example effective regeneration of an nitrogen oxide storage catalytic converters, ammonia storage catalytic converters and/or soot particle filters, which are/is comprised by the exhaust-gas aftertreatment device, is attained. Said so-called thermal desorption is permitted by temporarily raising or lowering the operating temperature of the exhaust-gas aftertreatment device by means of the predefinable setpoint temperature.

If it is determined at 306 that the setpoint temperature of the exhaust-gas aftertreatment device is higher than the temperature of the exhaust-gas aftertreatment device ("Yes"), the method continues to 308, in which the hybrid drive is operated only by the combustion engine. That is to say the entire output power of the hybrid drive or the drive power of the motor vehicle is provided by the combustion engine alone. The exhaust-gas temperature of the internal combustion engine is increased by increasing the power output by the internal combustion engine. The non-combustion motor is either shut down or is likewise driven by the combustion engine as a generator for charging a battery. According to the embodiment, the temperature of the exhaust-gas aftertreatment device is increased by the exhaust gas of the combustion engine.

It is pointed out that the exhaust-gas temperature of the combustion engine is, in a known way, directly related to the power demanded of or output by the combustion engine, the rotational speed and the combustion method (Otto or diesel engine). The above wording that the "exhaust-gas temperature of the combustion engine is higher than the temperature of the exhaust-gas aftertreatment device" accordingly includes that the exhaust-gas temperature of the combustion engine is higher, in particular as a result of a certain load demand predefined for example by a user, than the temperature of the exhaust-gas aftertreatment device. In other words, a high exhaust-gas temperature is to be equated with a high load demand or output power, and a low exhaust-gas temperature is to be equated with a low load demand or output power, and vice versa. Any wording hereinafter relating to the exhaust-gas temperature of the combustion engine or the load demand or the output power of the combustion engine should likewise be interpreted in this sense.

If it is identified at 306 that the setpoint temperature of the exhaust-gas aftertreatment device is not higher than the temperature of the exhaust-gas aftertreatment device ("No"), the method continues to 310, in which the hybrid drive is operated in a mixed operating mode. In the mixed operating mode, the combustion engine and the non-combustion motor simultaneously provide the output power of the hybrid drive, in particular the drive power of the motor vehicle. In said operating mode, the non-combustion motor, in particular the electric motor, drives for example the combustion engine, in particular the diesel engine, in order to reduce the load demand and consequently the exhaust-gas temperature of the combustion engine. Accordingly, a desired reduction in the temperature of the exhaust-gas treatment device is attained by the exhaust gases of the combustion engine flowing through the exhaust-gas after-treatment device.

In particular, the non-combustion motor preferably drives the combustion engine or assists the latter, in order to reduce the load demanded of the combustion engine or the power output by the combustion engine. Here, the degree of assistance by the non-combustion motor may be varied as a function of the power demanded for example by a user, in such a way that, in the case of a low load demand, the output power of the hybrid drive is provided substantially by the combustion engine, whereas with increasing power demand, the non-combustion motor contributes an increasing proportion of the output power of the hybrid drive. Therefore, operation of the combustion engine substantially in a low-load range with low exhaust-gas temperatures of the combustion engine is ensured even over a wide range of load demand.

The reduced load demand on the combustion engine by the non-combustion motor leads to a reduction in the exhaust-gas temperature of the combustion engine, as a result of which a reduction in the temperature of the exhaust-gas aftertreatment device can be realized as desired.

If it is identified in 304 that the exhaust-gas temperature of the internal combustion engine is not higher than the temperature of the exhaust-gas aftertreatment device ("No"), the method continues to 312, in which it is determined whether a setpoint temperature of the exhaust-gas aftertreatment device is higher than the temperature of the exhaust-gas aftertreatment device.

If it is identified 312 that the setpoint temperature of the exhaust-gas aftertreatment device is higher than the temperature of the exhaust-gas aftertreatment device ("Yes"), the method continues to 314, in which the hybrid drive is operated only by the non-combustion motor. During operation by only the non-combustion motor, the entire output power of the hybrid drive for driving the motor vehicle is provided by the non-combustion motor alone, in particular the electric motor. The combustion engine, in particular the diesel engine, is shut down such that no further (cool) exhaust gases can flow via the exhaust tract to the exhaust-gas aftertreatment device. The present temperature level of the exhaust-gas aftertreatment device is thereby maintained or—at least for a certain period of time—even increased by continuing oxidation processes in the exhaust-gas aftertreatment device and the thermal energy thereby released.

If it is identified at 312 that the setpoint temperature of the exhaust-gas aftertreatment device is not higher than the temperature of the exhaust-gas aftertreatment device ("No"), the method continues to 316, in which the hybrid drive is operated only by the combustion engine. In contrast to 308, in which the hybrid drive is likewise operated by only the combustion engine, the exhaust-gas temperature of the combustion engine is however lower, for example on account of a lower load demand, than the temperature of the exhaust-gas aftertreatment device, and the exhaust gas of the internal combustion engine can therefore be used directly as desired to reduce the temperature of the exhaust-gas aftertreatment device. The non-combustion motor can be used in the way already described in 308.

It is however also alternatively possible at 316 for the non-combustion motor to continue to be used in order to assist the combustion engine, as a result of which the load demand on the combustion engine is further reduced and the exhaust-gas temperature of the combustion engine is reduced yet further. This permits an even faster reduction of the temperature of the exhaust-gas aftertreatment device.

If it is identified in at 302 that the temperature of the exhaust-gas aftertreatment device is not lower than the threshold value ("No"), the method continues to 318, in which it is determined whether the oxygen concentration in the exhaust gas should be reduced.

If it is identified at 318 that the oxygen concentration in the exhaust gas should not be reduced ("No"), the method continues to 320, in which it is determined whether the exhaust-gas temperature of the combustion engine is lower than the temperature of the exhaust-gas aftertreatment device.

If it is identified at 320 that the exhaust-gas temperature of the combustion engine is lower than the temperature of the exhaust-gas aftertreatment device ("Yes"), the method continues to 322, in which the hybrid drive is operated only by the combustion engine. 322 substantially corresponds to 314 as already described. Since the exhaust-gas temperature of the combustion engine is lower than the temperature of the exhaust-gas aftertreatment device, the exhaust gas of the combustion engine can, as desired, be used directly to reduce the temperature of the exhaust-gas aftertreatment device.

If it is determined at 320 that the exhaust-gas temperature of the combustion engine is not lower than the temperature of the exhaust-gas aftertreatment device ("No"), the method continues to 324, in which the hybrid drive is operated in a mixed operating mode.

If it is determined at 318 that the oxygen concentration in the exhaust gas should be reduced ("Yes"), the method continues to 326, in which the hybrid drive is operated only by the non-combustion motor. During operation by only the non-combustion motor, the entire output power of the hybrid drive for driving the motor vehicle is provided by the non-combustion motor alone, in particular the electric motor. The combustion engine, in particular the diesel engine, is shut down such that no further exhaust gases can flow via the exhaust tract to the exhaust-gas aftertreatment device. In this way, in particular in the case of a lean combustion, that is to say in the case of a combustion with an excess of air, such as takes place for example in Otto engines operating in the lean-burn mode or in direct-injection diesel engines, the oxygen concentration in the exhaust gas is reduced. As a result of the reduced oxygen concentration in the exhaust gas, the conversion or oxidation processes in the exhaust-gas aftertreatment device slow abruptly. With increasing time duration, said processes come to a substantially complete stop, as a result of which no more thermal energy from the oxidation processes is released. Consequently, the temperature of the exhaust-gas aftertreatment device is reduced as desired.

322, 324, and 326 constitute alternative ways of reducing the temperature of the exhaust-gas aftertreatment device if the temperature of the exhaust-gas aftertreatment device has exceeded the threshold value. 322 and 324 describe the possibility of thermal cooling of the exhaust-gas aftertreatment device by exhaust gas of the combustion engine, the temperature of which has been suitably reduced, whereas at 326, the reduction in temperature of the exhaust-gas aftertreatment device is attained by suppressing the chemical processes in the exhaust-gas aftertreatment device by reduction of the oxygen concentration in the exhaust-gas flow. The two possibilities may be provided in each case individually or, as in the exemplary embodiment described, may be provided in parallel. In the latter case, the most expedient approach for the respective operating state of the hybrid drive or of the exhaust-gas aftertreatment device can be selected.

After 308, 310, 314, 316, 322, 324, or 326 explained above have been carried out as described, the method according to the disclosure ends. It is self-evident that, during the operation of the hybrid drive or of the exhaust-gas aftertreatment device, the method 300 according to the disclosure is run through anew between the start point and the end point at predetermined regular time intervals.

In some embodiments, the respective operating mode of the hybrid drive may be selected as a function of a predefinable spatial velocity of the exhaust-gas aftertreatment device. In a known way, the spatial velocity, by quotient formation, relates a volume flow, in this case in particular of the exhaust gas, to a spatial volume, for example of a catalytic converter and/or filter of the exhaust-gas aftertreatment device or else of the entire exhaust-gas aftertreatment device, wherein the reciprocal of the spatial velocity indicates the residence time.

According to this embodiment, it is therefore possible to adjust the flow speed of the exhaust gas flowing through the exhaust-gas aftertreatment device, and consequently the spatial velocity and the residence time of the exhaust-gas flow in the exhaust-gas aftertreatment device. Since the conversion efficiency of the exhaust-gas aftertreatment device is directly related to the spatial velocity or residence time of the exhaust gas in the exhaust-gas aftertreatment device, and the conversion performance is higher the lower the spatial velocity or the longer the residence time is, it is possible to ensure optimum operation with regard to exhaust-gas purification or conversion performance of the exhaust-gas aftertreatment device.

The spatial velocity can be predefined, in particular also varied during the operation of the exhaust-gas aftertreatment device. This permits a simple adaptation to different operating conditions which demand different spatial velocities for optimum operation of the exhaust-gas aftertreatment device.

FIG. 4 illustrates a flow diagram depicting an exemplary embodiment of another method 400 according to the present disclosure. In the exemplary embodiment described below, said method 400 is used for controlling the exhaust-gas aftertreatment device of the hybrid drive which has already been discussed in conjunction with the description of the exemplary embodiment shown in FIG. 3. Accordingly, the hybrid drive of the method 400 explained below is of the same design, such that said design will not be described again. However, in the method 400 described here, the respective operating mode of the hybrid drive is selected as a function of a predefinable spatial velocity of the exhaust gases of the hybrid drive.

Proceeding from the start point of the method 400, it is determined at 402 whether a low load demand for the hybrid drive or the combustion engine is present. If it is detected at 402 that a low load demand is present ("Yes"), the method continues to 404, in which the hybrid drive is operated only by the combustion engine, that is to say the entire output power of the hybrid drive or the drive power of the motor vehicle is provided by the combustion engine alone. The non-combustion motor, for example the electric motor, can be shut down in this case. Said non-combustion motor may then optionally be used, by the drive of the combustion engine, as a generator for charging an electric storage medium, in particular a battery.

Since the combustion engine is operated in a low-load range, the combustion engine discharges the exhaust gas at a relatively low flow speed. The low flow speed leads to a longer residence time of the exhaust gas in the exhaust-gas aftertreatment device and consequently to improved catalytic conversion and/or filtering. The conversion efficiency of the exhaust-gas aftertreatment device is thereby improved.

It is however also alternatively possible at 404 for the non-combustion motor to continue to be used in order to assist the combustion engine, as a result of which the load demand on the combustion engine is further reduced and the exhaust-gas flow speed of the combustion engine can be reduced further. In this way, it is possible to realize an even lower spatial velocity or longer residence time, and therefore the best possible conversion or exhaust-gas purification performance of the exhaust-gas aftertreatment device.

If it is determined at 402 that a low load demand is not present ("No"), the method continues to 406, in which the hybrid drive is operated in a mixed operating mode. In the mixed operating mode, the combustion engine and the non-combustion motor simultaneously provide the output power of the hybrid drive, in particular the drive power of the motor vehicle. In said operating mode, the non-combustion motor, in particular the electric motor, drives for example the combustion engine, in particular the diesel engine, in order to reduce the load demand and consequently the exhaust-gas flow speed of the combustion engine.

The degree of assistance by the non-combustion motor may preferably be adapted as a function of the power demanded for example by the user, in such a way that, in the case of a relatively low load demand, the output power of the hybrid drive is provided substantially by the combustion engine, whereas with increasing power demand, the non-combustion motor contributes a greater proportion of the output power of the hybrid drive. Therefore, operation of the combustion engine substantially in a low-load range with a low flow speed of the exhaust gas is ensured even over a wide range of load demand.

The reduced power demand on the combustion engine by the non-combustion motor thus leads, despite the higher load demand on the hybrid drive, to a longer residence time of the exhaust gas in the exhaust-gas aftertreatment device, as a result of which the purification or conversion performance of the exhaust-gas aftertreatment device is improved.

After 404 or 406 explained above have been carried out as described, the method ends. It is self-evident that, during the operation of the hybrid drive or of the exhaust-gas aftertreatment device, the method 400 is run through anew between the start point and the end point at predetermined regular time intervals.

Furthermore, according to another embodiment of the present disclosure, the spatial velocity can be predefined, in particular also varied during the operation of the exhaust-gas aftertreatment device. This permits a simple adaptation of the method according to the disclosure to different operating conditions which utilize different spatial velocities for optimum operation of the exhaust-gas aftertreatment device.

FIG. 5 illustrates a flow diagram depicting an exemplary embodiment of a method 500 according to the present disclosure. In the exemplary embodiment described below, said method 500 is used for controlling the exhaust-gas aftertreatment device of the hybrid drive which has already been discussed in conjunction with the description of the exemplary embodiment shown in FIGS. 3 and 4. Accordingly, the hybrid drive of the method 500 explained below is of the same design, such that said design will not be described again. In the method 500 described here, the respective operating mode of the hybrid drive is selected as a function of both temperature and a predefinable spatial velocity of the exhaust gases of the hybrid drive.

Method 500 comprises, at 502, determining if the temperature of the aftertreatment device is equal to a desired temperature. The desired temperature of the device may be any suitable temperature for the current operating conditions. For example, if the device is in normal operation, the desired temperature may be the light-off temperature. In other conditions, such as when it is indicated the device is to be regenerated, the desired temperature may be higher than light-off temperature. If it is determined that the temperature of the device is at the desired temperature, method 500 proceeds to 504 to determine if the spatial velocity (SV) of the exhaust flowing through the device is at a desired spatial velocity. As explained above, the lower the spatial velocity of the exhaust, the greater the conversion performance of the aftertreatment device due to the longer residence time of the exhaust in the device. In order to increase the conversion performance, the spatial velocity may be adjusted by adjusting the amount of exhaust flowing through the device. In order to determine the desired spatial velocity, one or more of the age of the device, the type of device, the size of the device, exhaust temperature, and the current operating state of the device may be considered. For example, older aftertreatment devices may have reduced conversion efficiencies and thus may have lower optimal spatial velocities. If it is determined that the current spatial velocity is equal to the desired spatial velocity for the current conditions, method 500 proceeds to 506 maintain current operating parameters in order to continue to deliver exhaust at the current temperature and flow rate.

If it is determined at 504 that the current spatial velocity is not equal to the desired spatial velocity, method 500 proceeds to 508 to determine if the current spatial velocity is greater than the desired velocity. If it is determined that the current velocity is greater than the optimal velocity, the amount of load placed on the motor may be increased at 510 to reduce the load on the engine and thus reduce the spatial velocity by reducing the exhaust flow. In some embodiments, depending on current overall driver-requested torque and the amount of the desired spatial velocity, the load placed on the motor may be increased such that all wheel torque is provided by the motor. In other embodiments, the engine may continue to provide a portion of the torque.

If it is determined that the current spatial velocity is less than the desired velocity, method 500 proceeds to 512 to decrease the load placed on the motor and increase the load placed on the engine to increase flow through the aftertreatment device. In some embodiments, the motor may still provide a portion of the torque to the wheels, while in other embodiments, the engine may provide all the requested torque. Further, in some embodiments, additional action may be taken to increase exhaust flow, such as opening the throttle, adjusting spark timing, etc. After 506, 510, and 512, method 500 proceeds to return to the beginning of the method to continually ensure the temperature of the exhaust device is at an optimum, desired temperature, and that the spatial velocity is at a desired velocity for current operating conditions.

Returning to 502, if it is determined that the aftertreatment device is not operating at a desired temperature, method 500 proceeds to 514 to determined if the temperature of the device is above the desired temperature. If the temperature of the device is above the desired temperature, method 500 proceeds to 516 to determine if the temperature of the exhaust is less than the temperature of the device. If the exhaust temperature is less than the device temperature, the exhaust may be used to cool the device down to the desired temperature. Thus, at 518, the hybrid drive is operated by only the engine. If the exhaust temperature is greater than the device temperature, the motor may be operated to provide some of the driver-requested torque, and the engine may provide torque as well.

If, at 514, it is determined that the temperature of the device is not greater than the desired temperature, method 500 proceeds to 522 to determine if the exhaust temperature is greater than the device temperature. If so, the exhaust may be used to heat the device, and thus at 524, the hybrid drive is operated by only the engine. If the exhaust temperature is not greater than the device temperature, both the motor and engine may be operated at 526 so that the exhaust does not continue to cool the device at an undesirable rate.

After 518, 520, 524, and 526, method 500 proceeds to return to determine if the device temperature is at the desired temperature. This way, after adjusting the relative loads on the engine and motor based on device temperature, if it is determined that the device has been brought to the desired temperature, the hybrid drive may be operated as a function of the spatial velocity, as described above.

Thus, the methods described with respect to FIGS. 4 and 5 provide for operating the hybrid drive as a function of a desired spatial velocity of the exhaust aftertreatment device. In one embodiment, a method for controlling the exhaust aftertreatment device of the hybrid drive comprises operating a combustion engine and a non-combustion motor which each provide an output drive power, including operating only the combustion engine, only the non-combustion motor, or by both the combustion engine and the non-combustion motor, as a function of an exhaust spatial velocity of the aftertreatment device. The desired spatial velocity of exhaust flowing through the aftertreatment device may be based on an age of the device, a type of the device, a size of the device, exhaust temperature, and a current operating state of the device. In another embodiment, a controller may control the hybrid drive to adjust a load placed on the motor based on the desired spatial velocity of exhaust flowing though the aftertreatment device.

The methods according to the present disclosure for controlling an exhaust-gas aftertreatment device of a hybrid drive is self-evidently not restricted to the exemplary embodiments described herein and shown in the figures. With regard to the present disclosure, it is for example not of importance whether the combustion engine and the non-combustion motor provide their respective output powers in series or in parallel. Corresponding serial and/or parallel engine drive arrangements, in particular such as serve for the propulsion of a motor vehicle, are well known to a person skilled in the art and are therefore also encompassed by the present disclosure.

Furthermore, for the embodiments described herein, it does not matter whether the combustion engine is an Otto engine or a diesel engine or any other type of engine whose working principle is based on the combustion of a fuel and which therefore produces an exhaust gas to be treated, for example purified of pollutants, by an exhaust-gas aftertreatment device. In contrast, the non-combustion motor may be for example an electric motor. Within the context of the present disclosure, however, said non-combustion motor may also be any other type of non-combustion motor which produces substantially no exhaust gas to be aftertreated or purified. Here, "exhaust gas not to be aftertreated" also means an exhaust gas which has considerably lower pollutant concentrations than the exhaust gas of the combustion engine or even has no pollutant concentrations, and which therefore requires substantially no aftertreatment. Accordingly, an electric motor operated by means of a fuel cell is also to be regarded as a non-combustion motor within the context of the present disclosure.

In a preferred embodiment, the methods according to the disclosure are used for controlling an exhaust-gas aftertreatment device of a hybrid drive for a motor vehicle, the hybrid drive comprising at least one combustion engine, in particular a diesel engine, and at least one non-combustion motor, in particular an electric motor, by the drive power of the hybrid drive for the propulsion of the motor vehicle is provided either by only the combustion engine or by only the non-combustion motor or in a mixed operating mode in which both the combustion engine and also the non-combustion motor output their respective output power simultaneously, and the operating mode of the hybrid drive is selected as a function of a predefinable temperature of the exhaust-gas aftertreatment device and/or a predefinable spatial velocity of the exhaust gases of the hybrid drive.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an exhaust aftertreatment device of a hybrid drive, comprising:
   operating a combustion engine and a non-combustion motor which each provide an output drive power, including each of operating only the combustion engine, only the non-combustion motor, and both the combustion engine and the non-combustion motor, as a function of an exhaust spatial velocity of the aftertreatment device; and
   determining a desired spatial velocity of exhaust flowing through the aftertreatment device based on an age of the device, a type of the device, a size of the device, exhaust temperature, and a current operating state of the device.

2. The method as claimed in claim 1, further comprising operating the hybrid drive by only the combustion engine if the combustion engine is operating in a low load range, and operating the hybrid drive by both the combustion engine and the non-combustion motor if the combustion engine is not operating in the low load range.

3. The method of claim 1, further comprising, if a current spatial velocity is greater than the desired spatial velocity, operating the hybrid drive by both the combustion engine and the non-combustion motor.

4. The method of claim 1, further comprising, if a current spatial velocity is greater than the desired spatial velocity, operating the hybrid drive by only the non-combustion motor.

5. The method of claim 1, further comprising, if a current spatial velocity is less than the desired spatial velocity, operating the hybrid drive by only the combustion engine.

6. A hybrid drive system, comprising:
 an engine coupled to an exhaust aftertreatment device;
 a motor; and
 a controller comprising a computer-readable storage medium comprising instructions executed to:
  adjust a load placed on the motor based on a desired spatial velocity of exhaust flowing though the aftertreatment device, including increasing the load when a current aftertreatment device temperature is greater than a desired temperature and an exhaust temperature is greater than the current aftertreatment device temperature.

7. The system of claim 6, wherein the instructions are further executed to increase the load placed on the motor when a current spatial velocity of exhaust flowing through the aftertreatment device is greater than the desired spatial velocity, and decrease the load placed on the motor when the current spatial velocity is less than the desired spatial velocity.

8. The system of claim 6, wherein the desired temperature is a desired aftertreatment device temperature.

9. The system of claim 6, wherein the instructions are further executed to decrease the load placed on the motor when the current aftertreatment device temperature is less than the desired temperature and the exhaust temperature is greater than the current aftertreatment device temperature.

* * * * *